United States Patent
Brandsma et al.

(10) Patent No.: US 9,788,682 B2
(45) Date of Patent: Oct. 17, 2017

(54) BEVERAGE BREWING DEVICE FOR AUTOMATICALLY BREWING AND DISPENSING SINGLE CUP QUANTITIES OF BEVERAGE THROUGH A VENDING MACHINE WITH MINIMAL MANUAL PARTICIPATION

(71) Applicants: David L. Brandsma, St. Charles, MO (US); Joseph P. Webster, St. Charles, MO (US)

(72) Inventors: David L. Brandsma, St. Charles, MO (US); Joseph P. Webster, St. Charles, MO (US)

(73) Assignee: Newco Enterprises, Inc., St. Charles, MO (US)

( * ) Notice: Subject to any disclaimer, the term of this patent is extended or adjusted under 35 U.S.C. 154(b) by 0 days.

(21) Appl. No.: 14/544,650

(22) Filed: Jan. 29, 2015

(65) Prior Publication Data
US 2016/0367066 A1 Dec. 22, 2016

Related U.S. Application Data

(60) Provisional application No. 61/966,495, filed on Feb. 25, 2014.

(51) Int. Cl.
*A47J 31/36* (2006.01)
(52) U.S. Cl.
CPC ....... *A47J 31/3638* (2013.01); *A47J 31/3628* (2013.01); *A47J 31/3633* (2013.01)
(58) Field of Classification Search
CPC ............. A47J 31/3638; A47J 31/3633; A47J 31/3628; A47J 31/3623; A47J 31/3604
USPC ..................... 99/295, 289 R, 302 P
See application file for complete search history.

(56) References Cited

U.S. PATENT DOCUMENTS

| | | |
|---|---|---|
| 5,325,765 A | 7/1994 | Sylvan et al. |
| 5,840,189 A | 11/1998 | Sylvan et al. |
| 6,079,315 A | 6/2000 | Beaulieu et al. |
| 6,182,554 B1 | 2/2001 | Beaulieu et al. |
| 6,606,938 B2 | 8/2003 | Taylor |
| 6,655,260 B2 | 12/2003 | Lazaris et al. |
| 6,666,130 B2 | 12/2003 | Taylor et al. |
| 6,672,200 B2 | 1/2004 | Duffy et al. |
| 6,708,600 B2 | 3/2004 | Winkler et al. |
| 7,024,985 B2 * | 4/2006 | Park ............... A47J 31/3619 99/289 R |
| 7,165,488 B2 | 1/2007 | Bragg et al. |

(Continued)

*Primary Examiner* — Reginald L Alexander
(74) *Attorney, Agent, or Firm* — Paul M. Denk (57) ABSTRACT

A single cup capsule brewing machine which incorporates a device for automatically brewing and dispensing single cups of coffee, or other beverages, the device containing a receptacle for receiving a single serve capsule, a housing for raising or lowering onto the capsule, and process the capsule during various sequences of operation of the brewing machine, an upper housing raising or lowering onto the capsule to attain sequential piercing of the capsule through an inlet probe and then an outlet probe, and for preparing a hot beverage for individual consumption, and then a lower housing that moves along an arc to provide for alignment of the capsule for a brewing cycle, or for shifting forwardly for interconnection of a capsule in preparation of a brewing cycle, or for shifting the capsule rearwardly for its disposal after performance of a brewing cycle.

3 Claims, 8 Drawing Sheets

(56) References Cited

U.S. PATENT DOCUMENTS

| | | | |
|---|---|---|---|
| 7,210,401 B1 | 5/2007 | Rolfes et | |
| 7,347,137 B2 | 3/2008 | Lafond et al. | |
| 7,513,192 B2 | 4/2009 | Sullivan et al. | |
| 7,930,972 B2 * | 4/2011 | Denisart | A47J 31/002 99/295 |
| 7,946,217 B2 * | 5/2011 | Favre | A47J 31/0668 426/433 |
| 8,079,300 B2 * | 12/2011 | Jing | A47J 31/3633 99/289 R |
| 8,875,617 B2 * | 11/2014 | Favre | A47J 31/3628 99/289 R |
| 2015/0289714 A1 * | 10/2015 | Zhu | A47J 31/44 99/289 R |

* cited by examiner

BEVERAGE BREWING DEVICE FOR AUTOMATICALLY BREWING AND DISPENSING SINGLE CUP QUANTITIES OF BEVERAGE THROUGH A VENDING MACHINE WITH MINIMAL MANUAL PARTICIPATION

CROSS REFERENCE TO RELATED APPLICATION

This non-provisional patent application claims priority to the provisional patent application having Ser. No. 61/966,495, filed on Feb. 25, 2014.

FIELD OF THE INVENTION

This invention primarily relates to beverage brewing, and more particularly to the single cup brewing of a cup of coffee, or other beverage, through a vending machine, that requires little or no manual participation other than selecting the beverage, and it's various flavorings.

BACKGROUND OF THE INVENTION

This invention relates to an apparatus for automatically brewing and dispensing single cup quantities of coffee or other beverages through a vending machine.

There are a myriad of prior art patents and publications that relate to single cup or pod brewing of beverages, particularly coffee, and perhaps others such as tea, hot chocolate, or the like.

Existing machines accept a sealed beverage cartridge or capsule, usually referred to as a capsule, as formed into a cup shaped housing, and generally being manually sealed within a vertically adjustable lid, wherein the cup can be pierced by both a liquid inlet, and a liquid outlet, so that usually hot water can be delivered to the capsule, brew the beverage, and then deliver it through the outlet to a cup or other container. Examples of these types of capsule or cartridge patents can be seen in the U.S. Pat. No. 5,840,189, disclosing a Beverage Filter Cartridge. A related type of cartridge is shown in the U.S. Pat. No. 5,325,765, also upon a Beverage Filter Cartridge.

Usually, such existing machines also include a lid, usually that is manually manipulated, and which incorporates a piercing penetrator or needle, that can deliver hot water to the internals of the capsule, and is also pierced by a second needle, that can withdraw the brewed beverage. These provide the means for the flow of hot water into the capsule, and its removal as brewed beverage therefrom. Usually, these apparatuses require manual participation, the physical manipulation of the lid into an opened position, removal of a spent capsule, reapplying a fresh and new capsule, manually manipulating the lid into closure, to initiate the operations of the brewing apparatus. Most of these types of brewing mechanisms are designed for household usage, and do not lend themselves towards automation that can be incorporated within vending machines, to serve a single cup of brewed beverage, such as coffee, as can be obtained from the current invention.

The prior art housings are further provided with a venting probe, that is mounted in the bottom of the housing, and provides, as stated, the means for the liquid to flow out of the cartridge or the capsule, after brewing. At the start of a brewing cycle, the capsule is forced down upon the top of the holder, which is supported by a spring or springs, and movably support a housing, with the venting probe penetrating the bottom portion of the capsule, that provides the means for the beverage to vent and a path for liquid to flow, of the brewed beverage, into a cup or container. Following this, in these prior art devices, the lid is then lowered onto the cartridge, and the upper probe then pierces the top of the capsule, and when sealed, provides a path for the introduction of hot liquid into the cartridge, to commence the brewing of a beverage. Following a brew cycle, the lid must be manually reopened, to remove the capsule prior to initiating another cycle.

Examples of prior art patents that disclose these types of machines can be seen in the patent upon Beverage Filter Cartridge Holder, in U.S. Pat. No. 6,079,315.

The Beverage Filter Cartridge Holder, for use in a brewing machine, of the prior art, can be seen in U.S. Pat. No. 6,182,554.

U.S. Pat. No. 6,606,938 shows a Two Step Puncturing and Venting of Single Serve Filter Cartridge in a Beverage Brewer. This prior art patent describes various components within its single serve beverage brewer such as a platen, the shifting of the platen, the platen being moved between a raised position, and a lowered position, in which its inlet probe pierces the lid of the shown cartridge. In addition, the specific method of operation of this particular brewer is that a tubular outlet probe initially pierces to vent the cartridge interior, usually through its bottom, and then the cartridge is pierced on top with a tubular inlet probe, during the sequence of its operations. Once again, this particular brewer does not appear to be an automated type of brewer, which can be used in a vending machine, but appears to describe a more domestic form of brewer.

The U.S. Pat. No. 6,655,260 does disclose a Beverage Filter Cartridge Holder, which appears to be more automated, in its operations. This device appears to incorporate a lid that is mounted for manipulation between its opened position for accommodating insertion and removal of its cartridge, and a closed position confining the cartridge within its housing. It appears that this device uses some type of a slidable drawer that can open or close for insertion or removal of its cartridge. Apparently, also, it requires positioning means upon the cartridge for cooperating with a locating means to furnish positioning of the cartridge within its apparatus in preparation for a brewing operation.

U.S. Pat. No. 6,666,130 shows a Baffle Operated Liquid Heating and Dispensing System for a Single Serve Beverage Brewer.

U.S. Pat. No. 6,672,200 shows a System for Monitoring and Controlling the Operation of a Single Serve Beverage Brewer.

U.S. Pat. No. 6,708,600 shows a Puncturing and Venting of Single Serve Beverage Filter Cartridge.

U.S. Pat. No. 7,165,488 shows a manually operated Brew Chamber for a Single Serve Beverage Brewer, which incorporates a manually operated arm to attain its setup.

U.S. Pat. No. 7,347,137 shows an Espresso Coffeemaker with Removable Water Reservoir as a related type of apparatus that includes a manually operative handle to attain its setup.

A similar type of structure is shown in U.S. Pat. No. 7,513,192, showing a Beverage Forming Device with Opening/Closing Mechanism for a Beverage Cartridge Receiver, which incorporates related structure. It is just not seen how that type of structure could be incorporated into a vending machine, for producing a single cup brewed beverage from a once used cartridge.

An early embodiment of the current style of invention that use specifically for brewing a beverage is shown in U.S. Pat.

No. 7,210,401, on a single cup pod beverage brewer. This particular device, which is a related predecessor to the current invention, utilized different structure for brewing a beverage from utilization of a pod, which is a type of container for holding coffee grounds or tea leaves, that is surrounded by filter paper formed in a disc-like shape. While related to the current invention, the invention described herein requires substantially different structure for processing a cup or capsule, not a pod, and to secure it in position while it is pierced by probes, both a top and bottom probe, in the preparation and while sustaining the brewing of a beverage from a cup, as distinct from a pod. This is subsequently described herein in the summary of this current invention.

The present invention improves upon the aforementioned machines and methods by providing a means to automatically pierce and seal the upper portion of a capsule, and that once that occurs, the seal continues to maintain closure on the top of the capsule, through its supporting springs, prior to the lowering of the capsule into the holder, at which time air or other gaseous material is introduced into the capsule by means of a pump means, to maintain the structural integrity of the capsule, and then secondarily and subsequently the bottom of the capsule is pierced in order to vent the bottom and remove the brewed beverage, from the capsule, during its brewing cycle. Then, the spent capsule can be automatically removed and disposed of without any manual participation, or the use of any lifting handle, as done in the prior art. Essentially, the principal concept of this invention is to provide an automatic brewing and dispensing single cup coffee brewer, that may be generally incorporated within a vending machine, for automatic usage and operation. All the purchaser or user need do is to press the proper buttons, to obtain a single cup brewed beverage from a singular filter or capsule.

SUMMARY OF THE INVENTION

The present invention is designed to provide a means for automating a mechanism inside of an automatic coffee vending machine to brew a single cup of coffee using a prepackaged single cup beverage cup or capsule. The user can choose from a variety of package types and/or beverage flavors which contain a quantity of ingredients that are soluble in hot water and provide the user with a single cup of a hot beverage, such as coffee, on demand.

Once the user has acquired and selected the desired beverage capsule, and then places his/her mug or cup into the dispensing area, all the user needs to do is push a button on the user display interface of the beverage vending machine which will activate a reversible motor which then moves the beverage housing forward, opening a spring loaded door, and presenting an empty cup, cartridge or capsule holder to the user of the machine. The user can then place the selected capsule into the holder, which is positioned upon springs, and which centers the holder into the brew chamber assembly. The user then can make a selection by pressing a button on the control panel which can further define the characteristics of the beverage by strength, or volume, as defined by the electronic settings configured for the identified button as selected.

Having pressed the desired selection button, the brewing chamber is activated, and its integrated drive motor that had presented the cartridge or capsule holder and which now holds the selected capsule reverses the direction of its movement and shifts the beverage holder into the vending machine, allowing the spring loaded door of the machine to close. At the same interval a solenoid pin located on the side supporting wall of the brewing mechanism is activated providing for a stopping point which locates the beverage holder in its correct angular alignment for the upper brewing lid assembly. Once in position, the upper brewing lid assembly reversible motor is activated and a drive cam is utilized to drive the assembly downwardly until the hollow piercing probe or needle pierces the top of the capsule. And the force of the needle seals against the top of the cartridge or capsule and drives the supporting springs downwardly. At this point, once piercing of the capsule at its top has occurred, compressed air or other gas is introduced into the capsule by means of a pump, which is in communication with the piercing probe, and the drive cam continues then to force a piercing of the bottom of the capsule, with a fixed lower venting probe. In their sequence, the top probe pierces the top of the capsule initially, and then subsequently the capsule is driven downwardly to attain a piercing of its bottom, that functions as a beverage outlet once it has been brewed within the singular capsule. At this point, hot water from a holding tank is pumped into the beverage cup or capsule through its upper piercing probe, communicating with the beverage medium contained within the capsule, and allows the beverage medium and the hot water to mix thoroughly inside the cup, cartridge or capsule, and which brewed beverage is then extracted under pressure and gravity through the opening made by the fixed lower venting probe or needle. This allows the brewed beverage to drain into the cup that receives the brewed beverage. Once the proper amount of water has been pumped through the cartridge, the hot water flow is interrupted, and an air pump activated to flush air through the piercing and venting probes, while still in communication with the capsule to extract any excess water from the cartridge prior to the end of the brewing cycle. Once the air and water flows are stopped, and the entire brewing cycle has been completed, the upper drive motor automatically reverses and the drive cam lifts the upper brew chamber, its piercing probe, and the seal, back into a position that relieves the spring pressure on the upper probe and seal and lifts the spent beverage cartridge or capsule up and away from the lower vent probe. When the electronic control mechanism recognizes that the upper brew beverage has reached its uppermost position, the upper drive motor is disengaged, and the lower drive motor is then energized to move the beverage holder and spent cup or cartridge over the operations of a cam which engages a lifting strap and lift spring out of the capsule holder, and deposits the spent cartridge or capsule generally into a rearwardly located waste bin. Thus, all of these features are automatically performed, mechanically, through electrical controls, so that a complete cycle can be performed without any manual participation on the part of the purchaser, other than perhaps locating the selected capsule into the capsule holder, in preparation for a brewing cycle. When the cycle is started once again, the user will again be presented with the empty capsule holder, for deposit of a newly selected beverage holding capsule, for the next brewing cycle.

It is, therefore, the principal object of this invention to provide a beverage brewing device for automatically brewing and dispensing single cup quantities of a beverage through a vending machine with minimal manual participation, other than the selection of the beverage cup or capsule, and locating it within its holder, if necessary.

Still another object of this invention is to substantially automate the concept of brewing a single cup of brewed beverage through a vending machine.

Yet another object of this invention is to minimize the participation of the purchaser of the beverage, to a simple selection process, and only necessitating the depression of a singular button, to initiate a brewing cycle.

These and other objects may become more apparent to those skilled in the art upon review of the summary of the invention as provided herein, and upon undertaking a study of the description of its preferred embodiment.

DESCRIPTION OF THE PREFERRED EMBODIMENT

Figure 1:
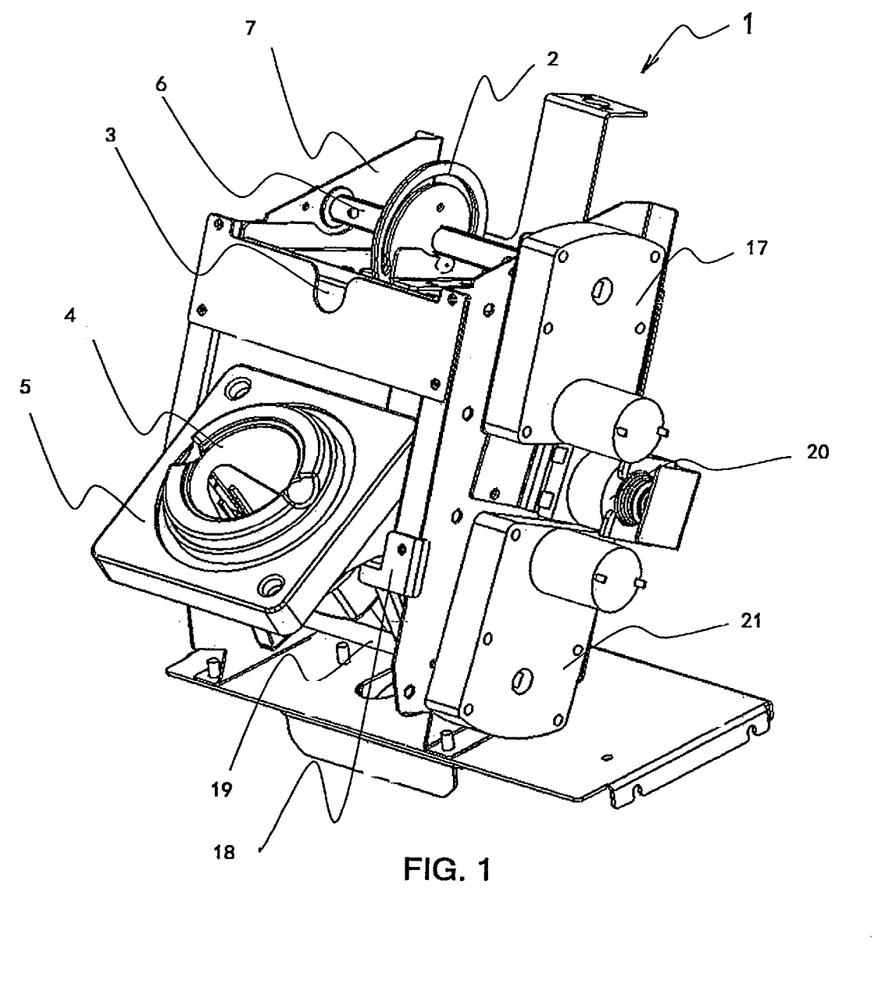
FIG. 1 is an isometric view of the automated brewing mechanism of this invention shown in a position to accept a selected beverage carton or capsule prior to initiation of a brewing cycle or process.

In referring to the drawings, FIG. 1 is an illustrational view of the brewing mechanism 1 as shown in a position to except a beverage cup, cartridge or capsule prior to the brewing process, and to initiate the same. Generally, FIG. 1 is an illustration of the brewing mechanism 1. The system includes an upper drive cam 2 that moves an upper drive shaft 6 as when driven up or down by the reversible gear motor 17, controlling the positioning of the upper brew chamber 3. The mechanism further includes a lower brew chamber 5, including a housing to accept a beverage cartridge or capsule, as at 4, which is moved into various positions by the lower drive shaft 19, as shown, in this figure, in a forward most position only limited by its stop bracket 18. The position of the brewing mechanism as shown in FIG. 1 is to accept a beverage cartridge prior to the brewing process.

Figure 2:
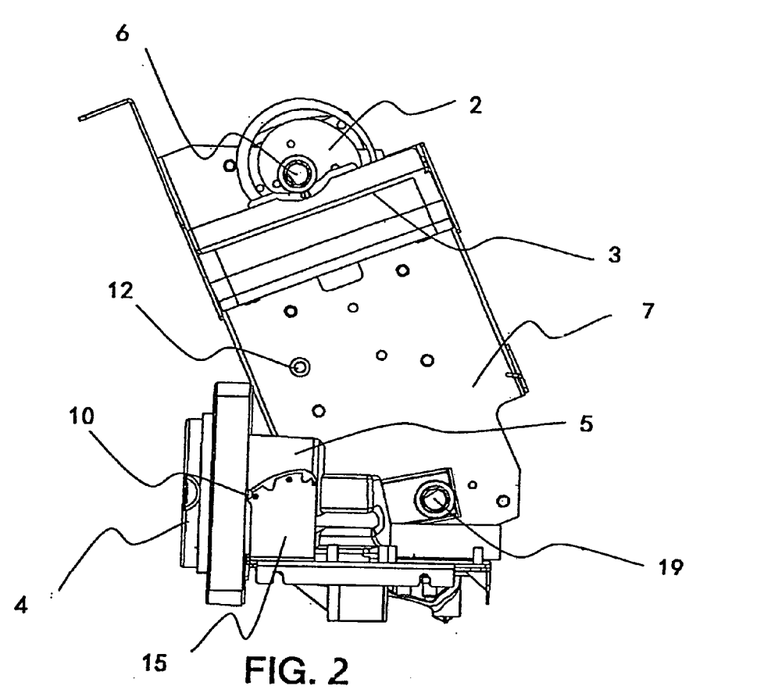
FIG. 2 is a side view of the brewing mechanism, showing its starting position before the brew cycle and also the position after the last brew cycle where the cartridge has been during which procedure the cartridge has been ejected into a rearwardly located waste bin.

As disclosed in FIG. 2, therein is shown the starting position before the brew cycle and also the position after the last brew cycle where the cartridge has been ejected into a waste bin (not shown). The position, of both the upper and lower brew chambers is determined by the rotation of the motor drive shafts controlled by the two reversing dc drive motors, as explained. The upper brew chamber movement is up and down as determined by its cam position and the lower chamber swings in a circular arc directly driven by the lower drive motor. This is also the position of the brew mechanism when there is a disruption in a brew cycle and the machine is powered off and then back on, the firmware in the coffee brewer will send the upper and lower chambers to their reverse motor or home positions. At this point, the mechanism is at rest and will stay in this position until a brewing cycle on the beverage brewer is activated.

Figure 3:
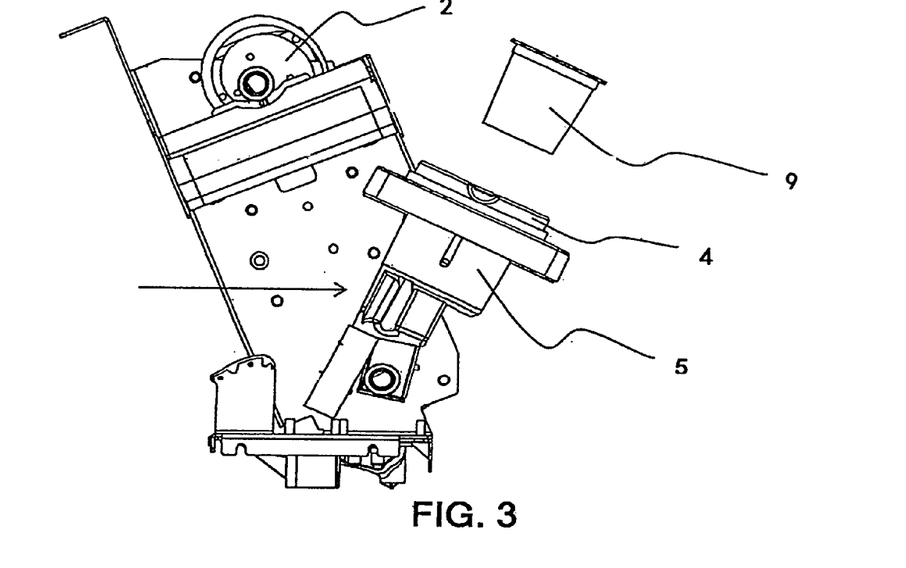
FIG. 3 shows a side view of the brewing mechanism after a brew button has been activated, where the holder for the capsule is presented at the front loading position ready to accept a beverage capsule from the user of the machine.

In FIG. 2, it specifically shows a cutaway illustration of the brewing mechanism assembly 1 in the "home" or ready position. The assembly 1 consists of side support panels 7, which hold and align the upper brew chamber 3 and the lower brew chamber 5. The upper brew chamber 3 is driven up and down by the drive cam 2, connected to the upper drive shaft 6. The drive shaft is connected to an ordinary dc gear motor 17, which is reversible by electronic signals, and controlling software. The position of ejection arm 10 is determined by contact with the ejection cams 15 located on either side of the lower brew chamber 5. See FIG. 7. The sequence of the drink preparation process is initiated as shown in FIG. 3, depicting a cutaway view of the brewing mechanism 1, showing the lower brew chamber 5 having been driven forwardly by gear motor 21 through the efforts of the lower drive shaft 19, and is located in a brew loading position as shown in FIG. 1. A beverage cup or capsule 9 can now be placed into the spring loaded capsule housing 4. The drive cam 2 is in the uppermost position at this time. A beverage selection is now initiated by the user of the machine which initiates the machine control device to send a signal to the lower brew drive motor 21, to reverse its direction and move the lower brew chamber 5.

Generally, FIG. 3, in the method of operation, shows the position after a brew button has been activated from the front control of the coffee brewer, and the lower brew mechanism travels towards the front of the machine where interference with the lower brew housing opens a spring loaded door and presents the capsule holder in a front loading position which is in a position to accept a drink capsule to the user of the machine. The control board or software senses that the lower motor has reached the forward travel position and turns off the lower drive motor.

Figure 4:
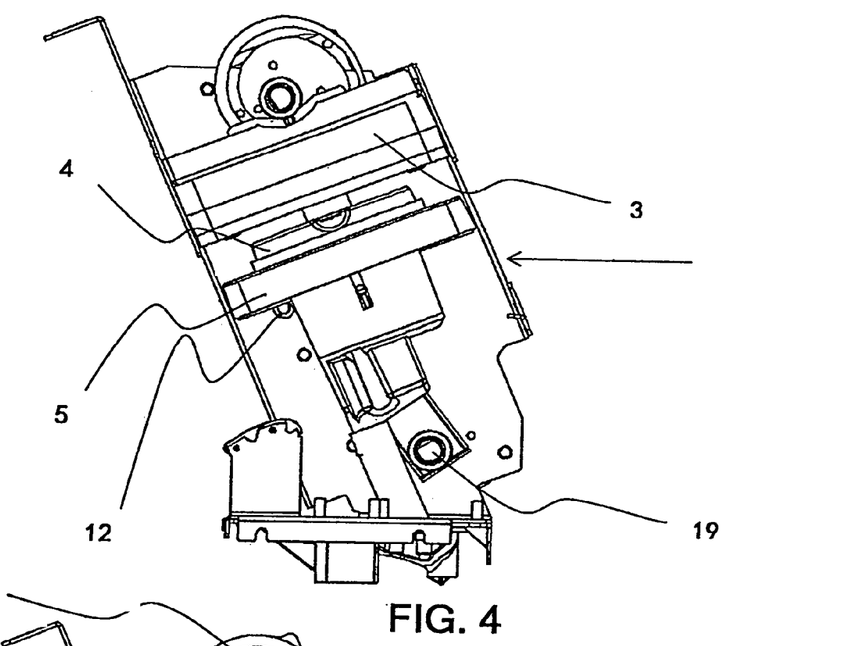
FIG. 4 provides a side view of the position of the brewing mechanism after the user has inserted a beverage capsule into its holder and has confirmed the selection of the drink desired, with the lower brew chamber then moving the holder and its capsule into an angular position which aligns it with the mechanism of the upper brew chamber for this machine.
Figure 9:
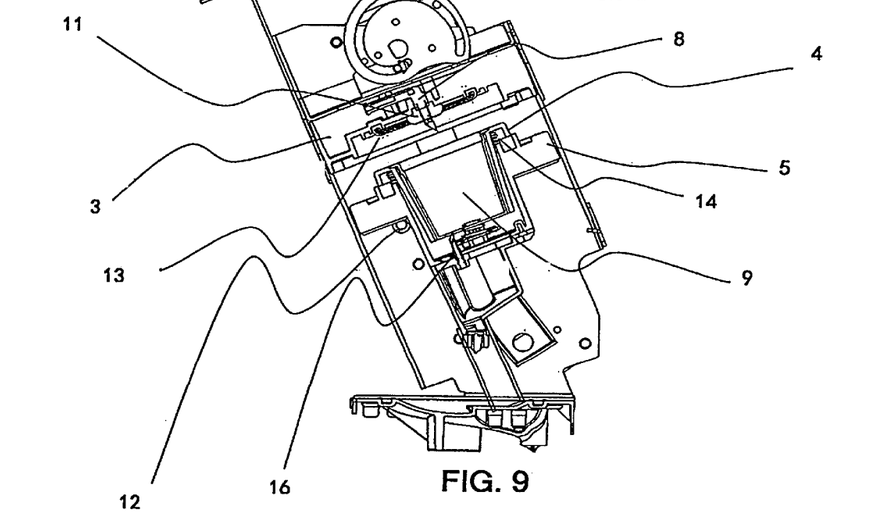
FIG. 9 depicts the brewing mechanism in a cutaway view where the lower brew mechanism is in the correct position to brew, and the upper mechanism is ready to start its downward travel to begin the piercing sequence of a brew cycle.

In referring to FIG. 4, this shows the position after the machine user has inserted the beverage container into the holder and has confirmed selection of the drink and the lower brew chamber moves into a position which aligns with and is parallel to the upper brew chamber. The motor movement stops when the control board senses an alignment pin which positions the lower brew chamber in the correct align with the upper chamber and shuts off the lower motor. FIG. 4, in addition to FIG. 9, shows views of the brewing mechanism 1, where the lower brew chamber 8 has been driven rearward by gear motor 21 through the operations of its lower drive shaft 19, and sets up the upper housing into a brewing position, the location of the lower brew chamber 5 determines by energizing solenoid 20 that drives the solenoid stop pin 12 which intercepts movement of the lower brew chamber 5. Once the electronic controls sense gear motor 21 current rise due to a stall current, the control turns off the power to the lower gear motor 21. The lower brew chamber 5, capsule housing 4, and the beverage capsule 9 are now in brew position aligning up in alignment with the upper brew chamber 3, angled rearwardly, as can be noted in FIG. 2. FIG. 9 further shows the construction of the brew chamber piercing needle 8, the brew chamber needle seal 11, the brew chamber outer seal 13, and the support springs 14, which hold the beverage capsule 9 in position during these multiple piercing processes. The ejection arm 10 is shaped to accommodate the lift spring 14 which helps lift the beverage cartridge 9 out of the capsule housing 4. The lower venting probe 16 is mounted to lower brew chamber 5. A beverage collecting funnel 22 is attached to the lower brew chamber 5.

Figure 5:
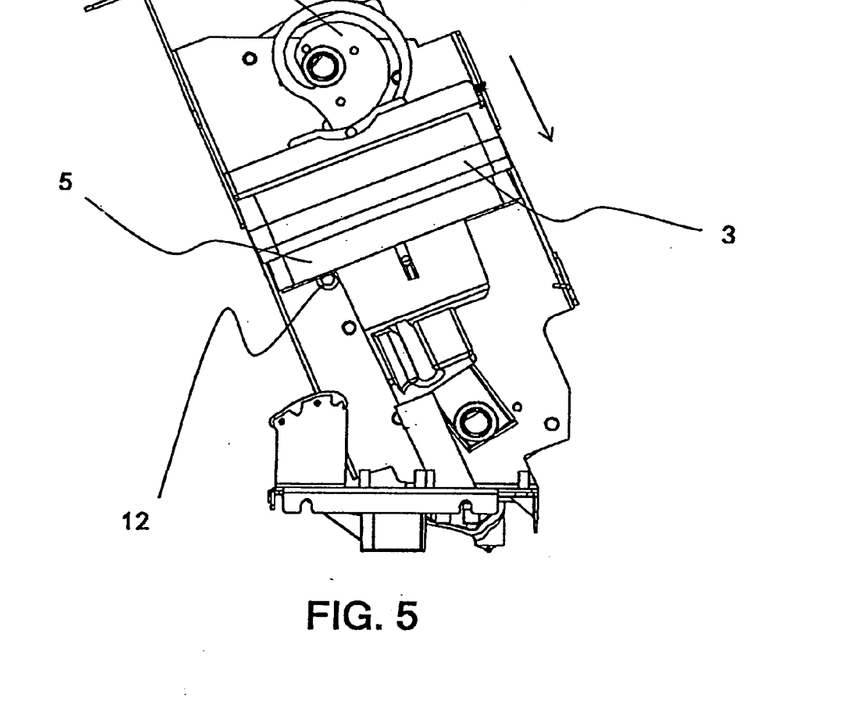
FIG. 5 shows the position of the brewing mechanism once the lower motor is turned off into a stop pin position, and the upper motor drives the upper brew chamber down until it senses that the upper chamber has bottomed out on the lower brew chamber, at which time the capsule is initially pierced first by the upper needle, and then subsequently by the lower needle, in preparation for a brewing process.

FIG. 5 shows the position once the lower motor is turned off in the stop pin position, the upper motor drives the upper brew chamber down until the control board senses the upper chamber has bottomed out on the lower brew chamber. During this movement the capsule is first pierced by the upper needle, and subsequently by the lower needle. Compressed air is introduced into the capsule, through the upper piercing needle 8, during the piercing process to aid rigidity to the capsule. The compressed air may be any acceptable gas, such as natural air, or even NO2, that can be used for maintaining the structural integrity of the capsule during the piercing process. As such, the brew chambers are now in a position where hot water can be pumped through the upper or inlet needle, through the capsule, and the drink can be routed out of the lower needle into a drinking cup. Note that the lower piercing needle pierces the lowermost point of the held capsule, and in this position, can drain out the entire brewed beverage from the capsule during a brewing operation, since the capsule, within its housing, is held in an angular position within the brewing device, during usage. Thus, the capsule 4 is located in an angular alignment, as can be seen in FIG. 9, and the lower needle 16 pierces at the lowermost location of the angulated capsule, as can be understood.

Figure 10:
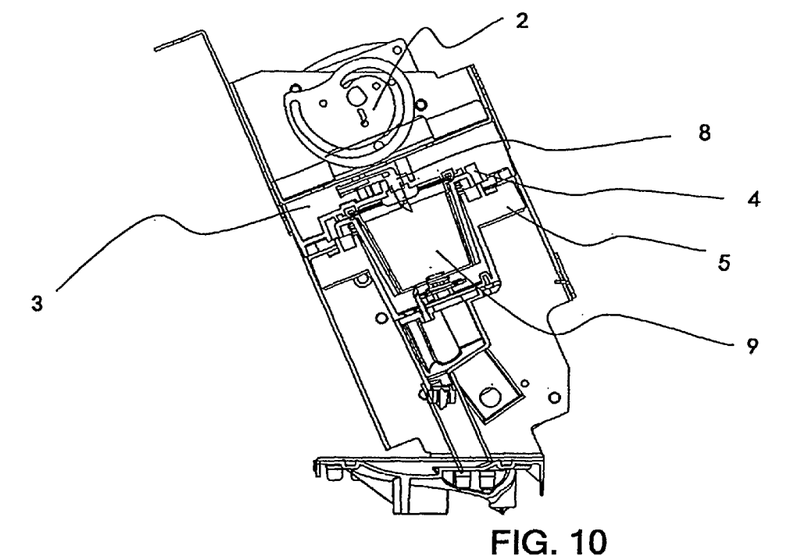
FIG. 10 provides a sectional side view of the brewing mechanism disclosing its support springs which hold the capsule in position while piercing the top of the capsule, and then under the force of the springs lowering the pierced capsule to attain a subsequent piercing by the lower needle.
Figure 11:
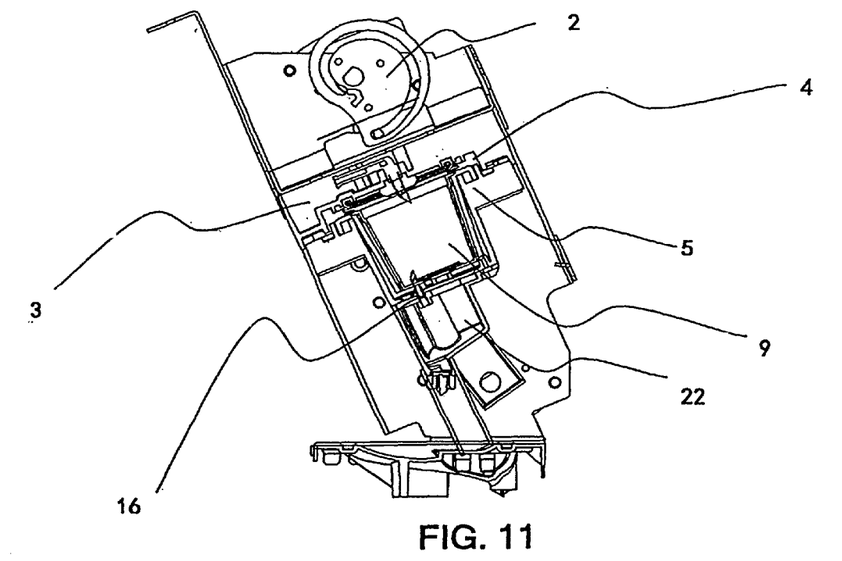
FIG. 11 shows the brewing mechanism where the downward force of the upper drive motor continues to drive the capsule downwardly, as stated, and the springs are forced to compress, to achieve a piercing by the lower needle of the bottom of the capsule.

More specifically, FIG. 5 is a cutaway view of the next sequential movement of the brewing mechanism 1, showing the downward movement and engagement of the upper brew chamber 3 being driven downwardly by the drive cam 2. FIG. 10 shows a cross sectional view of the brew mechanism 1 in the same position as further depicting the piercing sequence of the beverage capsule 9 as the upper gear motor 17 energizes causing the drive cam to drive the upper brew chamber 3 downwardly towards the capsule housing 4. The support springs 14 enable the brew chamber piercing needle 8 to pierce the top of the beverage capsule 9 prior to the capsule housing 4 coming into contact with the lower brew chamber 5, until upper chamber 3 is stopped by interference with the lower brew chamber 5, sensed by the control board to effect a stall current from the de-energized upper gear motor 17, locking the brew chamber 5 in a brewing position. Solenoid pin 12 is de-energized and moves out of the path of the lower brew chamber 5. As stated, compressed air or other gases are introduced into the capsule during the piercing process to add rigidity to the capsule. The brewing process is now able to occur through the upper probe 11, and the lower probe 16, as shown in FIG. 11, which is a cross sectional view of the brew mechanism 1 which further depicts the piercing and venting of the beverage capsule 9, during this sequence of operation. As the upper motor 17 continues to cause drive cam 2 to drive the upper brew chamber 3 towards the lower brew chamber 5, the beverage capsule 9 is then driven down over the vent probe or needle 16 as described for these FIGS. 5 and 11. The plurality of piercing needles 8 and the vent probe 16 in this configuration allows a pumped liquid beverage to flow through the beverage capsule 9, and collects in the beverage collecting funnel 22 before exiting the vending machine and into a common drinking cup.

Figure 6:
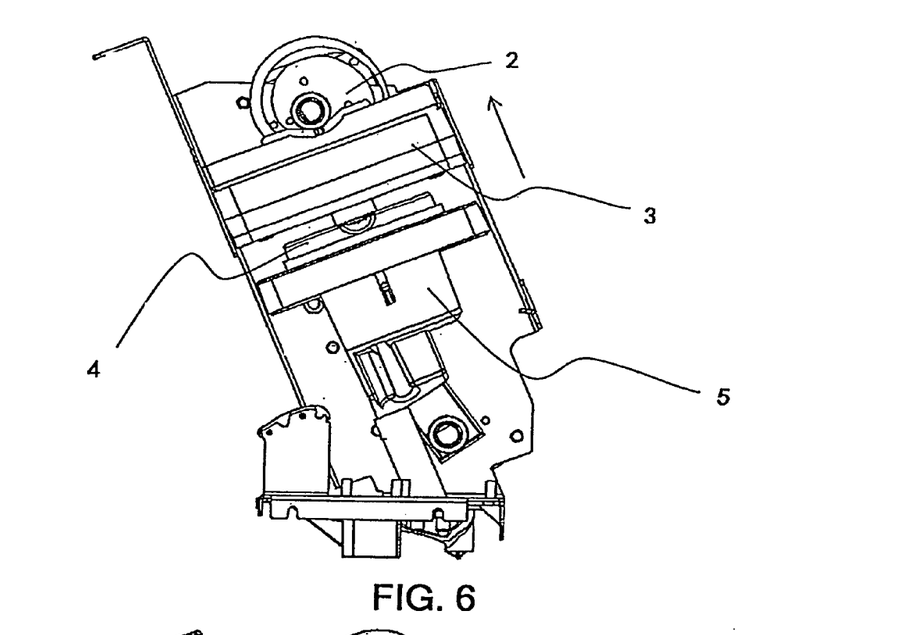
FIG. 6 shows the position of the brewing mechanism after a brewing cycle or routine has been completed, and the upper motor reverses direction and returns to its upper position, separating the spent capsule from the upper and lower needles.

FIG. 6 shows the position after the brewing routine has finished, the upper motor reverses direction and returns to the upper position. Once the control board senses the upper brew chamber is in the uppermost position, the motor stops. The upper chamber is now in the home position.

More specifically, after the liquid beverage is dispensed, the beverage capsule removal process initiates, as shown in this FIG. 6. FIG. 6 depicts the brew mechanism 1 after the brewing process has been completed and the control mechanism energizes the upper drive motor 17, and the drive cam 2, lifting the upper brew chamber 3 until the end of upward travel is reached, and the control mechanism senses a stall current and shuts off power to the upper gear motor 17. The electronic control device then energizes the lower gear motor 21, and drives the lower brew chamber 5 towards the ejection cam 15 through the lower drive shaft 19, which causes interference with the ejection arm 10, causing the ejection arm 10 to rise in the capsule housing 4, which in turn lifts the beverage capsule 9 out of the capsule housing 4, as also noted in FIG. 7. Further movement is shown in FIG. 8, after the brewing process has completed and the lower gear motor 21 continues to drive the lower brew chamber 5 through the ejection cam 15 via the lower drive shaft 19, causing further interference with the ejection arm 10, and causing the ejection arm 10 to expel the beverage capsule 9 out of the capsule housing 4.

Figure 7:
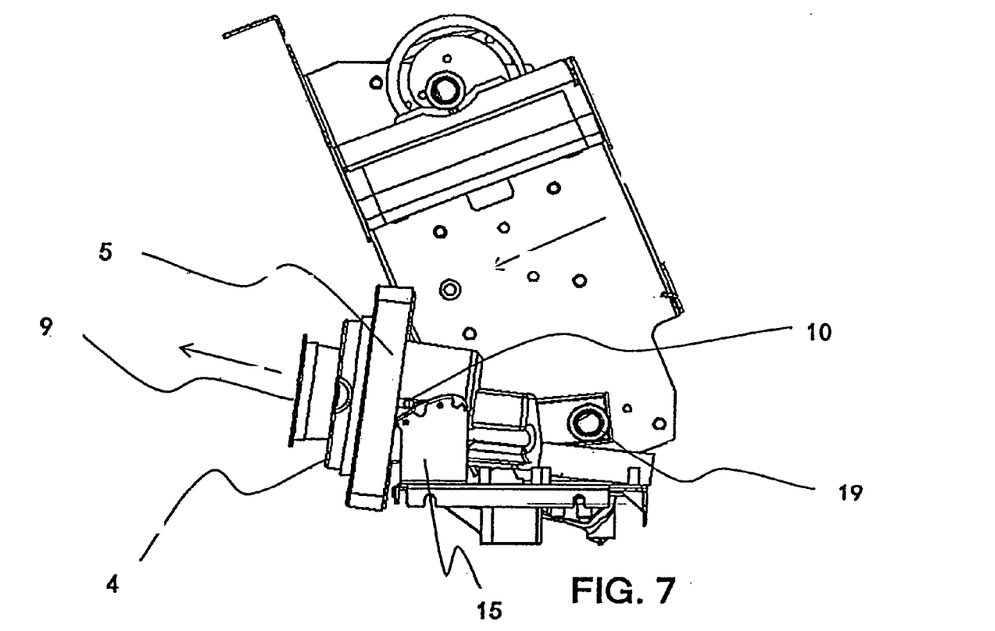
FIG. 7 shows the brewing mechanism in position where the lower motor now rotates in a reverse direction driving the capsule ejection arm along a cam surface which lifts the capsule up and out of its holder and thereby depositing the spent capsule into a waste tray and bin.

FIG. 7 shows the position where the lower motor now rotates in a reverse direction driving the capsule ejection arm along a cam surface which lifts the capsule up and out of the capsule holder, depositing the capsule in a waste tray. The capsule ejection arm has a spring in the center to assist in the ejection process of the spent capsule.

Figure 8:
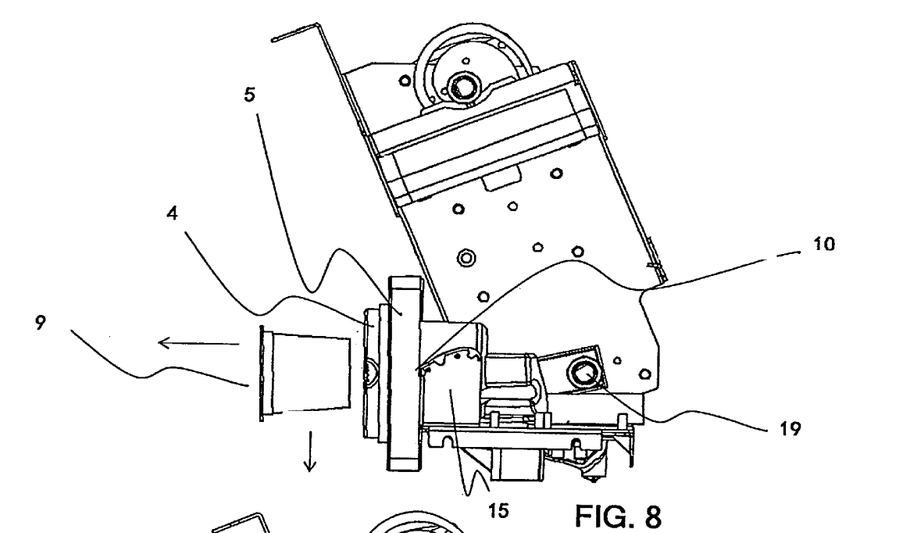
FIG. 8 shows the brewing mechanism where its lower brew chamber continues its reverse travel until it is in its initial home position, at which time the motor turns off, and the brew mechanism is back where it awaits a signal to start another brew routine or cycle.

FIG. 8 shows the lower brew chamber as it continues its reverse travel, until the circuit control board senses it is in a home position, when the motor turns off, and the brew mechanism is back where it awaits a signal to start another brew routine.

FIG. 9 depicts a cutaway view of the mechanism where the lower brew mechanism is in the correct position to brew, and the upper mechanism is ready to start downward travel to begin the piercing sequence of the brewing cycle.

FIG. 10 depicts the support springs which hold the capsule in position, while piercing the top of the capsule. The force of the springs is greater than the force that is necessary to pierce the top of the capsule, so that the upper inlet needle first pierces the capsule, and only after that, is the capsule driven downwardly for piercing of its bottom.

FIG. 11 shows the downward force of the upper drive motor as it continues to drive the capsule down, and the springs are forced to compress. The lower needle then pierces the bottom lower portion of the capsule. The control board senses the end of travel and begins the brewing cycle.

Figure 12:
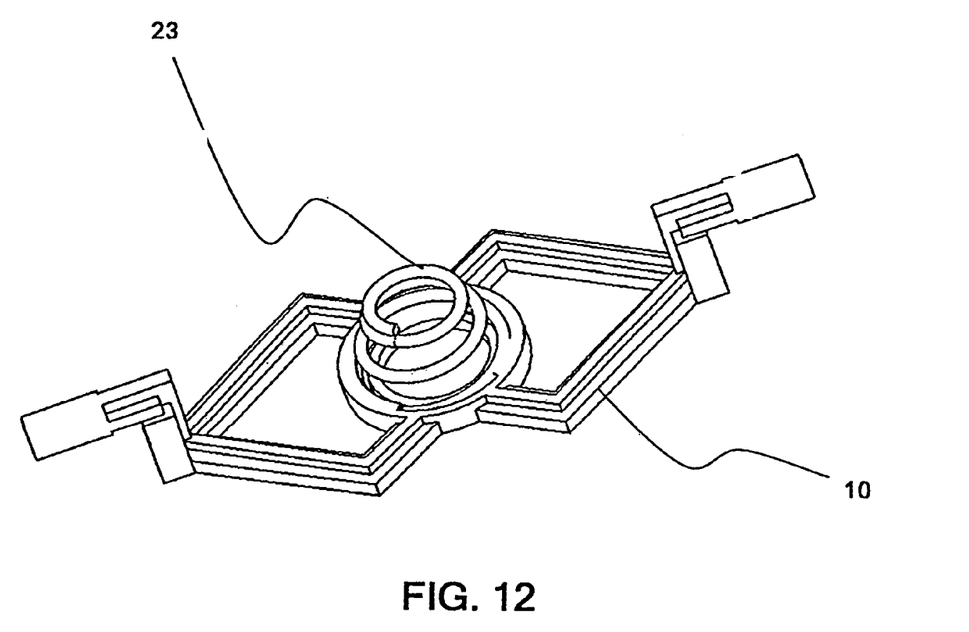
FIG. 12 shows the spring mechanism that functions as an ejection arm for forcing the spent capsule from its holder and into the waste collecting bin.

FIG. 12 depicts the capsule ejection arm with the spring assist attached. This FIG. 12 is a detailed view of the ejection arm 10, fitted with a lift spring 23, to assist in expelling the beverage capsule 9 into a waste container.

Figure 13:
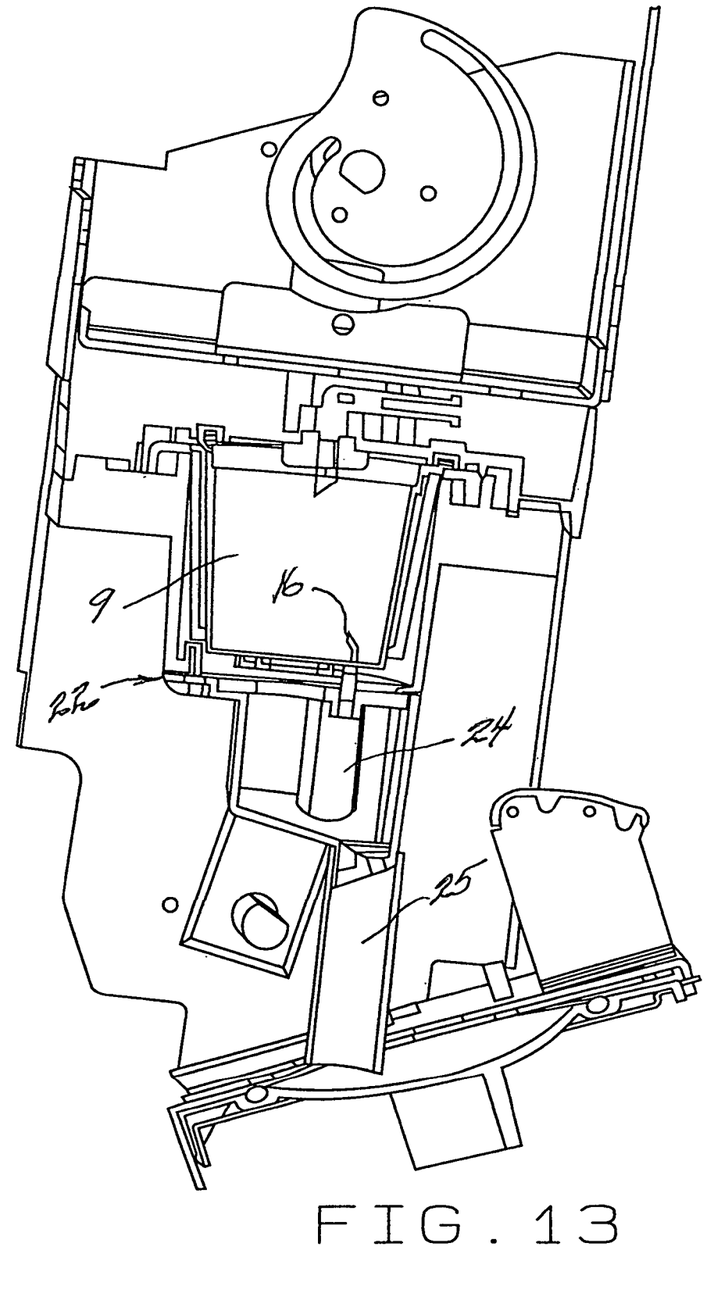
FIG. 13 provides the brewing mechanism similar to that shown in FIG. 9, but taken from an opposite side view, in the processing of brewing, where its upper needle has already pierced the top of the capsule, in preparation for completion of a brewing cycle.

As further noted, in FIG. 13, this furnishes an opposite side view of the beverage brewing device from that as disclosed in FIG. 9. As noted, its collection funnel 22 embraces the beverage capsule 9, such that when the beverage is brewed, it extends downwardly through the lower funnel tube 24, and conveys the brewed beverage that enters the lower needle 16, into the conduit 25 for deposit downwardly into a cup or other receiving receptacle that may have been previously located within the vending machine, to receive the brewed beverage, during its brewing operation.

In the method of operation of the brewing mechanism, as already briefly referred to, the sequence of its operations may be as follows. Generally, in FIG. 1, this shows the starting position before the brew cycle and also the position after the last brew cycle, where the cartridge has been ejected into a waste bin. The position of both the upper and lower brew chambers is determined by the rotation of the motor drive shafts controlled by the reversing dc drive motors. The upper brew chamber movement is up and down as determined by a cam position, and the lower chamber swings in a circular arc, directly driven by the lower drive motor. This is also the position of the brew mechanism when there is a disruption in a brew cycle and the machine is powered off, and then back on, where the firmware in the coffee brewer will send the upper and lower chambers to their reverse motors, or home positions. At this point the mechanism is at rest and will stay in this position until a brewing cycle on the coffee brewer is activated.

As previously noted in FIG. 2, and in FIG. 3, this sequence of operation occurs when a brew button, on the vending machine, has been activated from the front control on the coffee brewer, and the lower brew mechanism travels towards the front of its arc, and the machine where interference with the lower brew housing opens a spring loaded door and presents the capsule holder in a front loading position which is in a position to accept a drink capsule to the user of the machine. The control board senses that the lower motor has reached the forward travel position and turns off the lower drive motor.

FIG. 4 is the position of the mechanism in the brew position. The user will have confirmed selection of the drink, and the lower brew chamber has moved into a position which aligns and is parallel to, the inclined upper brew chamber. The motor movement is stopped when the control board senses an alignment pin which positions the lower brew chamber in the angular correct alignment with the upper chamber and shuts off the lower motor.

FIG. 5 shows the brew mechanism in brew position with the upper chamber being driven downwardly. Once the lower motor is turned off in the stop pin position, the upper motor drives the upper brew chamber down until the control board senses the upper chamber has bottomed out on the lower brew chamber. During this movement the capsule is pierced first by the upper needle, and subsequently by the lower needle, generally as explained in FIGS. 9, 10, and 11. The brew chambers are now in position where hot water can be pumped through the capsule and the drink can be routed into a drinking cup. As previously reviewed, just prior to the piercing process, air or other gas will be injected into the capsule to maintain its structural integrity during the piercing process.

FIG. 6 shows the brew mechanism after brewing. After the brewing routine is complete, the upper motor reverses direction and returns to its upper position. Once the control board senses the upper brew chamber is in the upper most position, the motor stops. The upper chamber is now back in its home position.

FIG. 7 shows the brew mechanism with the cam follower operated to eject the spent capsule. The lower motor now rotates in a reverse direction driving the capsule ejection arm along a cam surface which lifts the capsule up and out of the capsule holder, depositing the capsule into a waste tray or bin.

FIG. 8 shows the capsule being removed, and the brew mechanism locating back to its home position. The lower brew chamber continues its reverse travel until the control board senses it is in the home position, and the motor turns off. The brew mechanism is back where it awaits a signal to start another brew routine.

FIG. 9 shows the entire brew mechanism before brewing. This provides a cutaway view of the mechanism where the lower brew mechanism is in the correct position to brew, the upper brew mechanism is ready to start downward travel to begin the piercing sequence in preparation for a brew cycle.

In initiating the brew cycle, FIG. 10 shows the brew mechanism during piercing of the top of the capsule through its inlet needle or probe. The support springs hold the capsule in position while piercing the top of the capsule. The force of the springs is greater than the force that is necessary to pierce the top of the capsule.

FIG. 11 shows the brew mechanism during subsequent piercing of the bottom of the capsule. As the motor continues to drive the capsule down, and the springs 4 are forced to compress, the lower needle then pierces the bottom of the capsule, as noted at 16.

This provides a definition of the sequence of operations of the single cup brewing mechanism of this invention. As stated, generally this brewing mechanism is designed for incorporation within a more commercial type of vending machine, where individual cups of a coffee, tea, or the like, can be freshly brewed.

Variations or modifications to the subject matter of this invention may occur to those skilled in the art upon review of the invention as described herein. Such variations, if within the spirit of this invention, are intended to be encompassed within the scope of any claims to patent protection issuing hereon. The specific definition of the invention, and its depiction in the drawings, and its method of operation, are set forth for illustrative purposes only.

We claim:

1. A single cup capsule brewing machine for incorporation within a vending machine and which incorporates an upper housing, a lower housing supported by the upper housing, said lower housing having a capsule supporting structure therein, and provided for holding the capsule during brewing, said upper housing, and lower housing, in addition to any capsule held by the lower housing, are maintained in angular alignment with the vertical during a brewing operation, said upper housing including an upper cam means, a piercing inlet probe supported by the upper housing for vertical shifting through the operations of the upper housing cam means, a spring means for biasing against the capsule and to hold it in position as the upper piercing probe pierces the top of the capsule, and upon further downward movement of the upper housing compressing said spring means and causing the bottom of the capsule to be pierced by a lower piercing outlet probe, an upper motor operatively associated with the upper housing to pivot the upper cam means during its sequence of operations, the lower housing capable of pivoting within the upper housing, between a capsule piercing and brewing procedure when the lower housing is maintained in alignment with the upper housing, and a lower motor pivoting said lower housing rearwardly to provide for spring biased ejection of the spent capsule after completion of a brewing cycle, a lower cam operatively associated with the lower housing, and provided for pivoting the lower housing and its held capsule rearwardly for disposal after completion of a brewing cycle, wherein the upper inlet probe initially pierces the top of the located capsule, and gas supply operatively associated with the mechanism and provided for injecting a pressurized gas into the capsule during its upper probe piercing, to maintain the structural integrity of the capsule during the piercing process, and subsequently the lower outlet probe pierces the bottom of the capsule in preparation for performance of a brewing cycle.

2. The single cup capsule brewing mechanism of claim 1 and including a funnel provided for surrounding the located capsule during a brewing cycle, and provided for conveyance and delivery of the brewed beverage from the capsule and the brewing machine to a lower receptacle during performance of a brewing cycle.

3. A single cup capsule brewing machine for incorporation within a vending machine and which incorporates an upper housing, a lower housing supported by the upper housing, said lower housing having a capsule supporting structure therein, and provided for holding the capsule during brewing, said upper housing including an upper cam means, a piercing inlet probe supported by the upper housing for vertical shifting through the operations of the upper housing cam means, a spring means for biasing against the capsule and to hold it in position as the upper piercing probe pierces the top of the capsule, and upon further downward movement of the upper housing compressing said spring means and causing the bottom of the capsule to be pierced by a lower piercing outlet probe, an upper motor operatively associated with the upper housing to pivot the upper cam means during its sequence of operations, the lower housing capable of pivoting within the upper housing, between a capsule piercing and brewing procedure when the lower housing is maintained in alignment with the upper housing, and a lower motor pivoting said lower housing rearwardly to provide for spring biased ejection of the spent capsule after completion of a brewing cycle wherein the upper inlet probe initially pierces the top of the located capsule, and gas supply operatively associated with the mechanism and provided for injecting a pressurized gas into the capsule during its upper probe piercing, to maintain the structural integrity of the capsule during the piercing process, and subsequently the lower outlet probe pierces the bottom of the capsule in preparation for performance of a brewing cycle, said mechanism including a lift arm attached to the lower housing and incorporating a lift spring provided for lifting and expelling of said spent beverage capsule to disposal after completion of a brewing cycle.

* * * * *